UNITED STATES PATENT OFFICE.

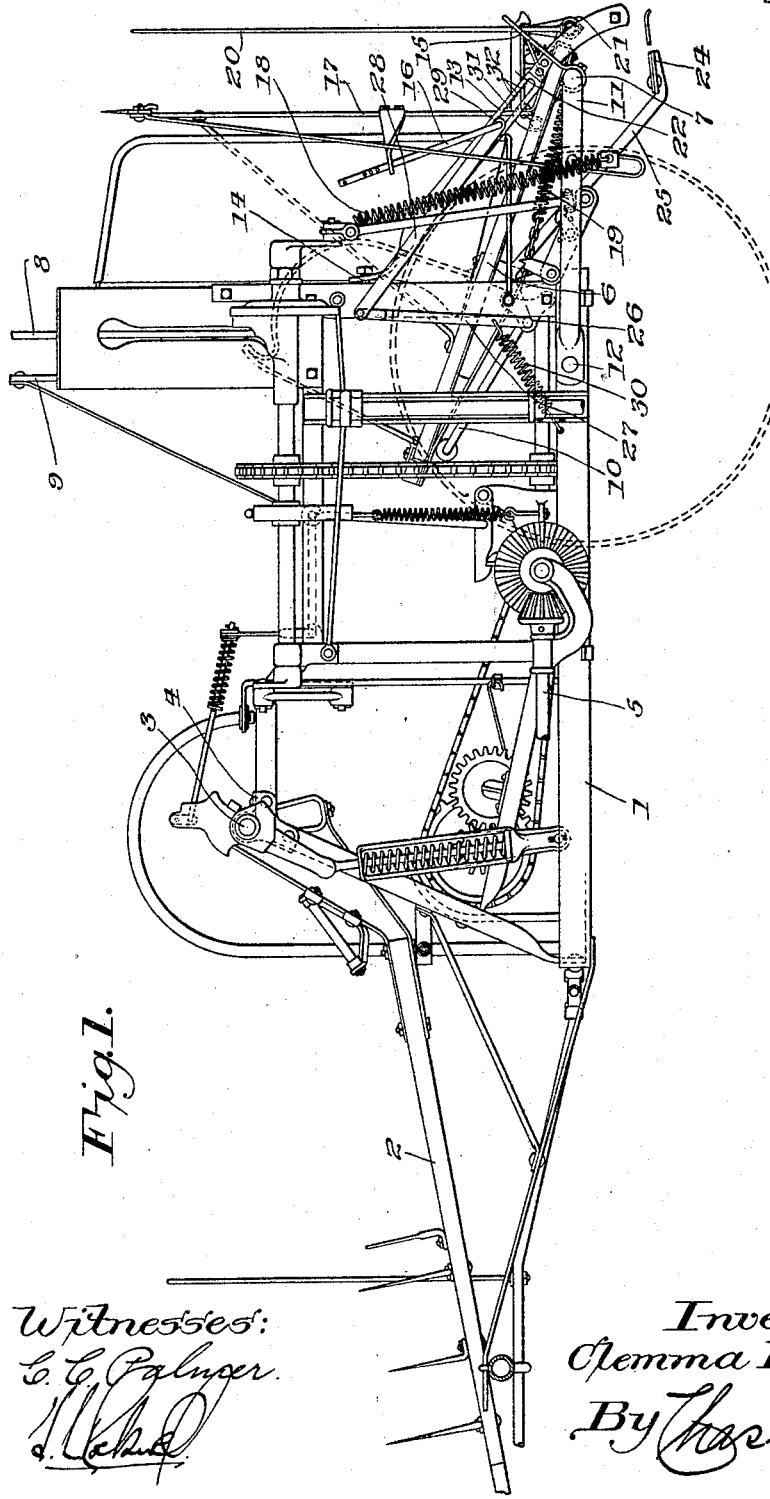

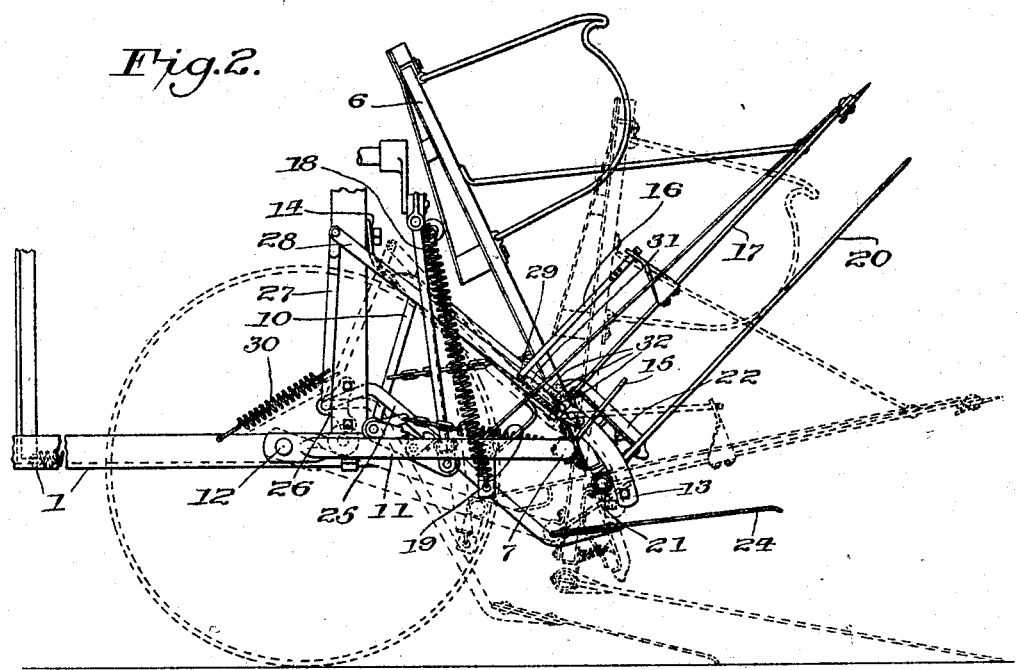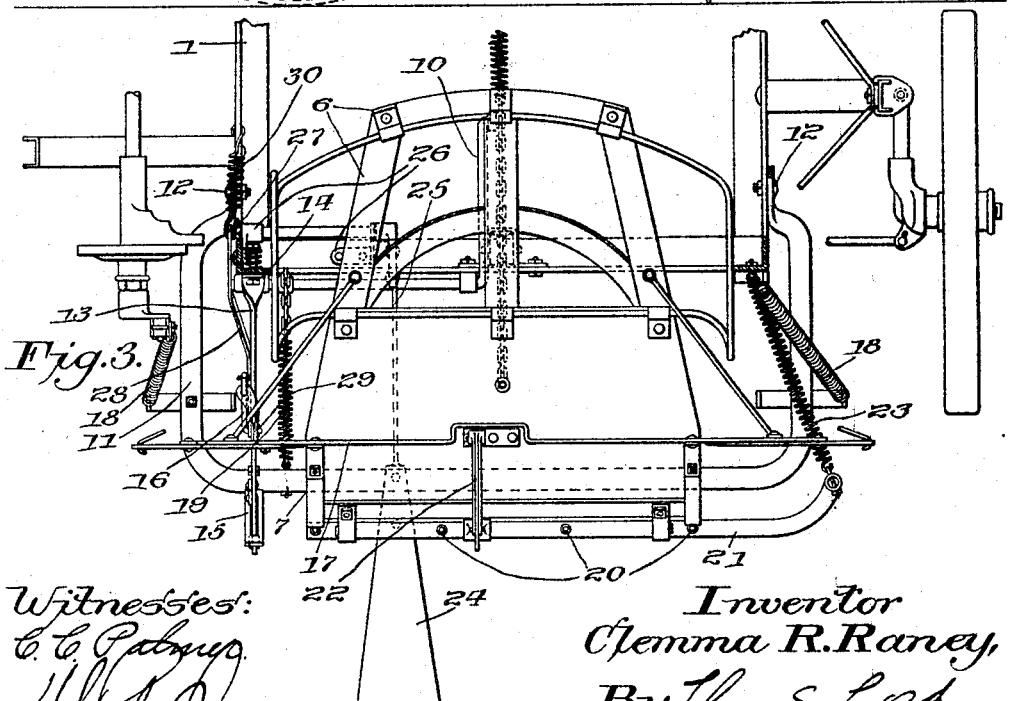

CLEMMA R. RANEY, OF CHICAGO, ILLINOIS, ASSIGNOR TO INTERNATIONAL HARVESTER COMPANY OF NEW JERSEY, A CORPORATION OF NEW JERSEY.

SHOCKING-MACHINE FOR GRAIN AND THE LIKE.

1,203,047.

Specification of Letters Patent.

Patented Oct. 31, 1916.

Application filed June 8, 1914. Serial No. 843,847.

*To all whom it may concern:*

Be it known that I, CLEMMA R. RANEY, a citizen of the United States, residing at Chicago, in the county of Cook and State of Illinois, have invented certain new and useful Improvements in Shocking-Machines for Grain and the like, of which the following is a full, clear, and exact specification.

My invention relates to shocking machines for grain and the like.

In my copending application, Serial No. 831,931, filed April 15, 1914, I have described a shocker of the type wherein a tiltable shock receptacle is pivoted on the shocker frame and means are provided for varying the elevation of the pivot of this receptacle as the latter is tilted thereabout in such a manner that as the shock is tilted toward vertical position, it is also given a decided downward impetus of such a character as to set its base firmly upon the ground and in general increase its stability. In that construction the mechanism controlling the downward movement of the shock receptacle is automatically controlled by the latter as it moves toward shock discharging position and is manually adjustable so that the point at which the dropping movement begins may be varied as desired in order to accommodate the device to use in grain of different lengths.

My present invention has for its object to render the adjusting mechanism of a device of this character entirely automatic, whereby the dropping mechanism is not only automatically operated by the receptacle, but the time of drop is automatically regulated by the length of the grain itself and without manual adjustment on the part of the operator.

A further object of my invention is to provide mechanism especially adapted to use in connection with grain of varying lengths, which mechanism operates automatically to tilt the shock and vary the dropping movement thereof in accordance with the length of the grain in such a manner that, when working in long grain, all crumpling at the base of the shocks is avoided.

Further objects of my invention are to provide improved controlling mechanism for the dropping mechanism, and in general to improve the construction of such devices.

These and other objects will more fully hereinafter appear.

I attain these objects by the provision of improved controlling mechanism actuated by the grain in the shock receptacle as the shock is set, this controlling mechanism being operatively connected to the mechanism controlling the dropping of the shock receptacle, all in a manner hereinafter more fully set forth.

In the accompanying drawings I have illustrated one embodiment which my invention may assume in practice, showing the same for purposes of illustration in connection with mechanism of the type claimed in my above mentioned application.

In these drawings: Figure 1 is a side elevation of a shocker equipped with my improvement. Fig. 2 is a detail side elevation of the rear of the shocker showing the shock receptacle and controlling mechainsm in a plurality of positions. Fig. 3 is a plan view of the shock receptacle when in the normal or sheaf receiving position shown in Fig. 1.

The shocker construction shown is of substantially the construction illustrated in my copending application mentioned above, comprising a frame 1 having a swinging sheaf delivery member or fork 2 fixed to a shaft 3 and journaled thereon in suitable bearings 4. This fork is driven from a power shaft 5 through any suitable connections and is moved through a substantially upright path to build up a prostrate shock in a shock receptacle 6 pivoted at 7 upon the rear frame and normally prostrate thereon. As described in that application, automatic means are provided for actuating a binding needle 8 and a compressor arm 9 to bind and compress the shock formed in this shock receptacle 6 when that shock has reached a predetermined size. Further, means are also provided for automatically actuating, after the completion of this shock compressing and binding operation, a swinging shock receptacle tilting member 10 movable upward to swing the cradle upward and rearward to shock discharging position. All of this mechanism, however, itself specifically forms no part of the present invention and need not be herein more specifically described.

The cradle is likewise mounted in the manner described in that application upon a rearwardly extending, supplemental frame 11 pivoted at 12 to the end of the main frame 1 and on opposite sides of the same. This supplemental frame normally occupies the position shown in Fig. 1 and is held in that position by a rearwardly and downwardly extending latch member 13 resiliently connected at 14 to the frame 1 and coöperating with a coöperating slotted latch member 15 projecting upwardly and rearwardly from the rear of the frame 11. This latch member 13 is in turn operatively connected through an adjustable link connection 16 with a standard 17 carried on the receptacle and movable therewith as the latter moves to tilting position, in such a manner that the latch member 13 is raised to disengage it from its coöperating latch member 15 and thus allow the rear end of the frame to drop, the cradle pivot being lowered directly and suddenly toward the ground after the cradle has been tilted to a predetermined degree adjustable by adjusting the connection 16. As in that construction, springs 18 and 19 are operatively connected to the frame 11 for returning the parts to their initial positions after the shock has been set. Further, as in that construction, rear end tines 20 are pivotally mounted at 21 at the rear of the receptacle and are controlled by a releasable latch mechanism 22 so that they may fall rearwardly independently of the cradle as the latter is tilted backward about its pivot, a suitable spring 23 connected between these tines and the shocker frame being provided to return these tines to their normal or up position (Fig. 1) after each shock is set.

In practice it has been found that as the grain varies in length the sheaves delivered to the shock receptacle 6 will have their butts protrude through these end tines 20 for variable distances, the long grain extending a substantial distance through the end tines, while the shorter grain only extends a relatively shorter distance beyond the same. It has also been found that when working in long and short grain it is advisable to drop the shock at different times, it being desirable when shocking long grain to drop the shock more quickly in order to prevent crumpling of the shock base or any tendency of the ends of the sheaves to strike the ground before the shock has been set in upright position, while in shocking short grain a comparatively late dropping has been found to be conducive to the formation of the most stable shocks. In my present invention I have taken advantage of the variation in the length of the butts protruding through the end tines, above referred to, in such a manner as to use it as a means assisting in adjusting the time when the shocks are dropped so that this time is determined automatically by the length of the grain, the protruding butts of the sheaves in the shocks striking a controlling member at different times in such a manner as to release the rear frame at different times and thus regulate the time of drop in accordance with the length of grain to be shocked. This mechanism includes a pivoted member 24 extending rearwardly beneath the pivot 7 of the shock receptacle and disposed in the path of the butts of the sheaves as the receptacle is tilted to set a shock. As shown, the rear end of the member is preferably enlarged in such a manner as to form a substantial surface for engagement with the sheaf butts and is connected to an upwardly and forwardly extending crank shaped arm 25 journaled on the shocker frame in a suitable bearing 26 at the grainward side of the receptacle. Extending upward from this journal is a second arm 27 fixed to the crank 25 and pivotally connected at its upper end to a third downwardly and rearwardly extending arm 28, which is in turn pivotally connected at 29 to the lower end of the link connection 16, hereinabove described, which controls the latch member 13. As shown, all of these connections are normally held in the full line position shown in Fig. 1 by a spring 30 connected between the arm 27 and a fixed part of the frame, and a longitudinally extending slot 31 is provided in the latch member 13 to receive the end of the latch controlling member 16, suitable notches 32 being provided on the edge of the slot in this latch member for a purpose hereinafter more clearly brought out.

In the operation of this construction it will, of course, be understood that when a shock has been built up in prostrate form in the shock receptacle 6, the compressor arm 9 and binding needle 8 will be operated when the shock has reached a predetermined size, in such a manner as to compress and bind the shock while in the receptacle, and that then the shock receptacle operating arm 10 will be operated to tilt the receptacle rearwardly about its pivot 7 toward the full line position shown in Fig. 2. As the receptacle moves rearward about its pivot through the link connection 16, the latch member 13 will be raised in such a manner as to release its coöperating latch member 15 and let the frame 11 drop downward in such a manner as to lower the pivot of the shock receptacle and drop the shock through a substantially vertical path directly upon the ground. However, as the shock receptacle is tilted, the butts of the sheaves protruding through the end tines 20 will strike the controlling member 24 and this member will be depressed toward the dotted line position shown in Fig. 2, throwing its crank mechanism into operation and projecting the member 28 rearwardly and downwardly in such a manner as to throw the pivotal connection 29 of the link 16 downward and rearward in the slot 31. As, while the receptacle continues to move backward, the link connection is pulled upward, this link connection will raise the latch member 13 and cause it to release its coöperating latch member 15, the pivotal connection 29, whatever its position, then being pulled into one of the notches 32 in the slot and using it as a means to prevent slipping while swinging the latch upward.

When working in long grain, when the sheaf butts extend a substantial distance through the end tines, these butts will strike the member 24 quite quickly so that the receptacle will drop quickly, while, when the grain is shorter, since the butts will protrude through the end tines 20 a shorter distance, these butts will not strike the controlling member 24 until later, or, in fact, if very short, may not strike at all, the latching mechanism being actuated in the normal manner by the link 16 as the receptacle is tilted. Obviously, under these circumstances, the dropping action of the receptacle will be correspondingly deferred. It will also be understood that as the standard 17 moves rearward toward the dotted line position shown in Fig. 2 and the parts return to their initial positions due to the action of the cradle returning springs, these parts will have ample play in the slot 31 in the latch member so that there will be no cramping of the same in action. Obviously, also, when desired, by suitably adjusting the link connection 16, the dropping point of the receptacle may be further varied as desired.

It is to be noted that in this construction it is unnecessary for the operator to adjust the mechanism in the normal operation of the machine, the mechanism, except for the adjustable connection 16, being entirely automatic within the limits for which it is set so that the short shocks are dropped when comparatively close to the ground and the long shocks are dropped at a relatively earlier time, all in such a manner as to build sheaves of grain of varying length into shocks of a uniform and substantial character well adapted to stand in the field.

While I have in this application specifically described one form which my invention may assume in practice, it is, of course, to be understood that it may assume other forms than that shown and that I do not limit myself to the precise construction chosen for purposes of illustration.

What I claim as my invention and desire to secure by Letters Patent is:

1. In a shocking machine, a frame, a shock receptacle thereon, mechanism for moving said receptacle with respect to the ground as a shock is set thereby, and controlling means for said mechanism controlled by the length of the grain in said receptacle.

2. In a shocking machine, a frame, a tilting shock receptacle pivoted thereon, mechanism for moving the pivot thereof bodily with respect to the ground as said receptacle is operated, and controlling means for said mechanism controlled by the length of the grain in said receptacle.

3. In a shocking machine, a frame, a tilting shock receptacle pivoted thereon, mechanism for moving the pivot thereof with respect to the ground as said receptacle is operated, and controlling means for said mechanism actuated by the shock in said receptacle as the latter is tilted.

4. In a shocking machine, a frame, a tilting shock receptacle pivoted thereon, means for moving the pivot thereof with respect to the ground as said receptacle is operated, and means operated by the shock in said receptacle for regulating the time of such movement of said receptacle.

5. In a shocking machine, a frame, a tilting shock receptacle pivoted thereon, means for dropping the pivot thereof toward the ground as said receptacle is operated, and means actuated by the shock in said receptacle as the latter is tilted for varying the time of such dropping action.

6. In a shocking machine, a frame, a tilting shock receptacle pivoted thereon, means for dropping the pivot thereof toward the ground as said receptacle is operated, and means actuated by the shock in said receptacle as the latter is tilted for actuating said dropping means.

7. In a shocking machine, a frame, a tilting shock receptacle pivoted thereon, means for moving the receptacle pivot with respect to the ground as said receptacle is operated, and means actuated as said receptacle is tilted for varying said movement in accordance with the length of the shock in said receptacle.

8. In a shocking machine, a frame, a tilting shock receptacle pivoted thereon, means for moving the pivot thereof with respect to the ground as said receptacle is operated, and means operated by the shock in said receptacle for automatically regulating the time of movement of said pivot in accordance with the length of the shock.

9. In a shocking machine, a frame, a tilting shock receptacle pivoted thereon, means for dropping the pivot thereof toward the ground as said receptacle is operated, and means actuated by the shock in said receptacle as the latter is tilted for varying the time of said dropping action in accordance with the variations in the length of shocks in said receptacle.

10. In a shocking machine, a frame, a tilting shock receptacle pivoted thereon, means for moving the pivot of said receptacle with respect to the frame as the former is tilted, and means disposed in the path of a shock carried in said receptacle as the latter is tilted operatively connected to said last mentioned means and controlling the time of operation of the same.

11. In a shocking machine, a frame, a tilting shock receptacle pivoted thereon, means for dropping the pivot of said receptacle toward the ground as said receptacle is operated, and means automatically operable by said receptacle as it is tilted for automatically varying the amount of drop of the pivot thereof in accordance with variations in the length of the shock in said receptacle.

12. In a shocking machine, a frame, a tilting shock receptacle pivoted thereon, means for dropping the pivot thereof toward the ground as said receptacle is operated, and means automatically set in operation by said receptacle as it is tilted for automatically timing the dropping of the pivot thereof in accordance with variations in the length of the shock in said receptacle.

13. In a shocking machine, a frame, a tilting shock receptacle pivoted thereon, means for dropping the pivot of said receptacle toward the ground at a predetermined point in the operation thereof, and means actuated upon movement of said receptacle for accelerating the dropping action thereof as the length of the shock in said receptacle increases.

14. In a shocking machine, a frame, a tilting shock receptacle pivoted thereon, means for normally dropping the pivot of said receptacle toward the ground at a predetermined point in the operation thereof, and means actuated upon movement of said receptacle for retarding the dropping action thereof as the length of the shock in said receptacle decreases.

15. In a shocking machine, a frame, a tilting shock receptacle pivoted thereon, means for normally dropping the pivot of said receptacle toward the ground at a predetermined point in the operation thereof, and means for accelerating or retarding the operation of said dropping means upon an increase or a decrease respectively in the length of the shock in said receptacle.

16. In a shocking machine, a main frame, a supplemental frame operatively connected to said main frame, a tilting shock receptacle pivoted on said supplemental frame, latching mechanism for releasing said supplemental frame from said main frame as the receptacle is tilted, and means actuated by the sheaves in the receptacle as the latter is tilted controlling the actuation of said latching mechanism.

17. In a shocking machine, a frame, a supplemental frame, means normally locking said frame in a predetermined relation, a tilting shock receptacle pivoted on said supplemental frame, means controlled by said receptacle controlling the connection of said frames, and means engaged by the shock carried by said receptacle as the latter is tilted controlling said controlling means.

18. In a shocking machine, a frame, a supplemental frame, means normally locking said frames in a predetermined relation, a tilting shock receptacle pivoted on said supplemental frame, means movable with said receptacle as it is tilted for releasing the connection of said frames, and means controlled by the length of the shock carried in said receptacle controlling the time of release of said frames.

19. In a shocking machine, a frame, a supplemental frame pivoted thereto, latching mechanism normally holding said frames in predetermined relation, a tiltable shock receptacle pivoted on said supplemental frame, an operative connection between the same and said latching mechanism, and means disposed in the path of a shock set by said receptacle for varying the relative positions of said operative connection and said latching mechanism.

20. In a shocking machine, a frame, a supplemental frame pivoted thereto, latching mechanism normally holding said frames in predetermined relation including a latch member, a tiltable cradle pivoted on said supplemental frame, operative connections between said cradle and said latch member for releasing said latch upon tilting of said cradle, and means operable as said cradle is tilted for shifting the point of connection of said operative connections longitudinally of said latch member.

21. In a shocking machine, a frame, a supplemental frame pivoted thereto, latching mechanism normally holding said frames in predetermined relation including a latch member, a tilting shock receptacle pivoted on said supplemental frame, means movable with said receptacle for operating said latch, and supplemental means operable as said receptacle is tilted and before said latch is operated for adjusting said means with respect to said latch.

22. In a shocking machine, a frame, a supplemental frame pivoted thereto, latching mechanism normally holding said frames in predetermined relation including a notched latch member, a shock receptacle pivotally mounted on said supplemental frame, a latch operating member movable with said cradle engageable with the notches on said latch member, and means controlled by the length of the shock in said receptacle for adjusting said latch lifting member in said notches prior to the lifting operation thereof.

23. In a shocking machine, a frame, a supplemental frame pivoted thereto, latching mechanism normally holding said frames in predetermined relation including a slotted latch member, a tiltable cradle pivoted on said supplemental frame, operative connections between said cradle and the slot in said latch member for releasing said latch upon tilting of said cradle, and means actuated by a shock discharged by said cradle for adjusting said connections in said slot.

24. In a shocking machine, a frame, a supplemental frame pivoted thereto, latching mechanism normally holding said frames in a predetermined relation including a latch member having a notched slot therein, a tiltable cradle pivoted on said supplemental frame, a link connection between said cradle and said slot, and a controlling member disposed in the path of a shock set by said cradle operatively connected to said frame and the connection between said cradle and latch member for adjusting said connection longitudinally of said slot.

25. In a shocking machine, a frame, a supplemental frame pivoted thereto, latching mechanism normally holding said frames in a predetermined relation including a latch member having a notched slot therein, a tiltable shock receptacle pivoted on said supplemental frame, means for operating the same, a link connection between said receptacle and said slot, and a controlling member disposed in the path of a shock set by said receptacle operatively connected to said frame and link connection and movable with the latter longitudinally of said slot prior to the completion of the movement of said receptacle about its pivot.

26. In a shocking machine, a frame, a supplemental frame pivoted thereto, latching mechanism normally holding the same in predetermined relation including a slotted latch member, a tiltable cradle pivoted on said supplemental frame, a link connection intermediate a part of said cradle and a point in the slot in said latch member, a longitudinally disposed member journaled on the frame and projecting at one end beneath the shock carried by said receptacle, and means operatively connected between said member and said link connection for varying the position of said connection in the slot in said latch member in accordance with variations in the length of the shock carried by said receptacle.

27. In a shocking machine, a frame, a supplemental frame pivotally connected thereto, latching mechanism normally maintaining the same in predetermined relation, a shock receptacle pivoted on said supplemental frame, normally upright end tine mechanism carried on said receptacle, and means for releasing the latch mechanism between said frames at different points in the tilting of said cradle about its pivot in accordance with the amount that the sheaves in said receptacle protrude through said end tines.

28. In a shocking machine, a frame, a supplemental frame pivoted thereto, latching mechanism normally holding the same in predetermined relation including a latching member, a tilting shock receptacle pivoted on said supplemental frame, operative connections between said receptacle and latching member for releasing said supplemental frame as the receptacle is tilted, and a controlling member for said operative connections operatively connected thereto and having a portion thereof disposed in the path of a shock in said shock receptacle.

29. In a shocking machine, a frame, a supplemental frame pivoted thereto, latching mechanism normally holding the same in predetermined relation including a latching member, a tilting shock receptacle pivoted on said supplemental frame, operative connections between said receptacle and latching member for releasing said supplemental frame as the receptacle is tilted, a controlling member for said operative connections operatively connected thereto, and means normally maintaining said controlling member in the path of the shock.

30. In a shocking machine, a frame, a supplemental frame pivoted thereto, latching mechanism normally holding the same in predetermined relation including a latching member, a tilting shock receptacle pivoted, on said supplemental frame, operative connections between said receptacle and latching member for releasing said supplemental frame as the receptacle is tilted, and a spring-pressed normally operative controlling member for said operative connections operatively connected thereto and having a portion thereof disposed beneath the shock in said shock receptacle.

In testimony whereof I affix my signature, in the presence of two witnesses.

CLEMMA R. RANEY.

Witnesses:
LAMONT DANIELS,
J. J. FOLEY.

Copies of this patent may be obtained for five cents each, by addressing the "Commissioner of Patents, Washington, D. C."